United States Patent [19]

Krumpelt et al.

[11] 4,292,378
[45] Sep. 29, 1981

[54] THERMAL REGENERATION OF AN ELECTROCHEMICAL CONCENTRATION CELL

[75] Inventors: Michael Krumpelt, Naperville; John K. Bates, Plainfield, both of Ill.

[73] Assignee: The United States of America as represented by the United States Department of Energy, Washington, D.C.

[21] Appl. No.: 148,326

[22] Filed: May 9, 1980

[51] Int. Cl.³ .................... H01M 8/06; H01M 6/36
[52] U.S. Cl. .................... 429/15; 429/17; 429/20; 429/102; 429/112; 429/201; 429/199
[58] Field of Search .................... 429/15, 17, 19, 20, 429/26, 34, 103, 112, 120, 70, 101, 199–201, 218, 102, 194, 196

[56] References Cited

U.S. PATENT DOCUMENTS

| | | | |
|---|---|---|---|
| 3,186,872 | 6/1965 | Ewing | 429/17 |
| 3,414,437 | 12/1968 | Doundoulakis et al. | 429/70 |
| 3,540,934 | 11/1970 | Boeke | 429/19 X |
| 3,671,322 | 6/1972 | King et al. | 429/103 |
| 3,887,399 | 6/1975 | Seiger | 429/15 |
| 4,053,684 | 10/1977 | Zito, Jr. | 429/15 |
| 4,064,327 | 12/1977 | King et al. | 429/112 |
| 4,145,483 | 3/1979 | Bonnemay et al. | 429/103 |

*Primary Examiner*—Anthony Skapars
*Attorney, Agent, or Firm*—Hugh W. Glenn; Robert J. Fisher; Richard G. Besha

[57] ABSTRACT

A system and method for thermally regenerating an electrochemical concentration cell having first and second aluminum electrodes respectively positioned in contact with first and second electrolytes separated by an ion exchange member, the first and second electrolytes being composed of different concentrations of an ionic solvent and a salt, preferably an aluminum halide. The ionic solvent may be either organic or inorganic with a relatively low melting point, the ionic solvent and the salt form a complex wherein the free energy of formation of said complex is less than about −5 Kcal/mole. A distillation column using solar heat or low grade industrial waste heat receives the first and second electrolytes and thermally decomposes the salt-solvent complex to provide feed material for the two half cells.

26 Claims, 4 Drawing Figures

THERMAL REGENERATION OF AN ELECTROCHEMICAL CONCENTRATION CELL

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to an electrochemical cell of the concentration type which is thermally regenerative using a low grade heat source. Thermally regenerative electrochemical cells have previously been suggested as topping devices for nuclear reactors to convert heat from reactors operating at temperatures higher than can be tolerated in steam cycles. One such cell was based on the lithium hydride system. Lithium hydride thermally decomposes to hydrogen and lithium at temperatures in the range of about 900° C. to 1200° C. and thereafter is recombined in the fuel cell. The fuel cell has a molten salt electrolyte which dissolves the lithium hydride and serves as a transparent medium, the cell operating at a temperature of about 500° C. and having potential of between about 0.3 and 0.4 volts. The design electrical efficiency of the lithium hydride system is about 15% and 17%.

Another example of a thermally regenerative electrochemical cell is the sodium amalgam system in which mercury is distilled off the amalgam and returned to the dilute side of the concentration cell. The concentration cell and the distillation column or still are operated at about 500° C., the cell having a potential of about 0.4 volts and the design efficiency being about 7%. In one example the electromotive force of the electrochemical cell is derived from the free energy of formation of a compound, lithium hydride, and in the other example the electromotive force is derived from the concentration differences in the sodium amalgam system.

It is desirable to provide a thermally regenerative cell operative with low grade heat sources, such as solar energy from a solar collector or low grade waste heat from industrial processes. Optimally, the cell should be designed to operate at temperatures below 400° C. and preferably less than 300° C. Both the lithium hydride system and the sodium amalgam system previously discussed operate at temperatures substantially above the optimal temperatures for low grade heat sources.

Representative literature in the field includes U.S. Pat. No. 3,671,322 issued to L. A. King et al., June 20, 1972 for Electrochemical Cell with Aluminum Electrodes and Different Electrolyte Concentrations in Two Compartments, the King et al. patent describing a concentration cell having aluminum electrodes, an aluminum chloride-sodium chloride electrolyte activating at temperatures in the range of about 125 to about 180° C., the cell voltage being about 0.2 volts.

The Doundoulakis et al. U.S. Pat. No. 3,414,437 issued Dec. 3, 1968 for Fluid Circulating Battery System describes cells using separate anodic and cathodic mixtures which are collected for disposal after use. U.S. Pat. No. 3,887,399 issued June 3, 1975 to Seiger for Method for Producing Electrical Energy with Consumable Aluminum Anode describes an activated aluminum anode alloyed with mercury with an aqueous electrolyte in which the cathode is of porous carbon or a porous metal. The activated aluminum anode may be activated by the addition thereto of metals such as gallium, cadmium, indium or thallium.

U.S. Pat. No. 4,064,327 issued Dec. 20, 1977 to King et al. for Aluminum-Chlorine Thermal Battery describes a concentration cell with an aluminum anode, an inert metal cathode and a two-layered pelletized electrolyte sandwiched therebetween, the electrolyte being a combination of aluminum chloride and one or more of sodium chloride, lithium chloride, potassium chloride and the tetra substituted ammonia chloride salts. Cell potentials of about 0.6 volts are reported. U.S. Pat. No. 4,145,483 issued Mar. 20, 1979, to Bonnemay et al. for Accumulators Including Halogen Electrodes Operating With Fused Halide Based Electrolytes discloses accumulators of aluminum/aluminum halide mixtures and alkaline metal halide and metallic derivatives in a graphite matrix.

SUMMARY OF THE INVENTION

A principal object of the invention is to provide a system and method for producing electricity from an electrochemical cell and continually recharging the cell by using low grade heat such as solar heat or industrial waste.

Another object of the invention is to provide a system and method for thermally regenerating an electrochemical cell in batch operation which has storage capability for times wherein the heat sources are unavailable.

Still another object of the invention is to provide a method of regenerating an electrochemical cell comprising providing first and second metallic electrodes respectively positioned in contact with first and second electrolytes separated by an ion exchange member, the first and second electrolytes being composed of different concentrations of an ionic solvent and a salt having cations of the metallic electrodes, the ionic solvent and the salt in the concentrations of one of the first and second electrolytes forming a complex wherein the free energy of formation of the complex is less than about $-5$ Kcal/mole, providing thermal decomposing means for receiving the first and second electrolytes and thermally decomposing the complex thereby producing a first feed material for the first electrolyte having a high concentration of the cations and a second feed material for the second electrolyte having a low concentration or none of the cations, and recycling the first feed material to the first electrolyte and the second feed material to the second electrolyte, thereby regenerating the electrochemical cell.

Still another object of the invention is to provide a system comprising an electrochemical cell having two compartments separated by an ion exchange member with a metallic electrode in each compartment, one compartment having therein a first electrolyte of an ionic solvent and a salt having cations of the metallic electrode and the other compartment having therein a second electrolyte of the ionic solvent and the salt with the first and second electrolytes having different concentrations of the cation, the ionic solvent forming a complex with the salt wherein the free energy of formation of the complex is less than about $-5$ Kcal/mole, means connected to the cell receiving the first and second electrolytes and producing material having a high concentration of the cations and a material having a low concentration or none of the cations, and means for recycling the material having the high concentration of the cation to the compartment having therein the first electrolyte and for recycling the material having a low concentration or none of the cations to the compartment having therein the second electrolyte, thereby regenerating the electrochemical cell.

A further object of the invention is to provide a method and system of the type set forth in which the ionic solvent and the salt forming the complex both have melting points less than about 300° C., and the means for producing material having a high concentration of the cations and a material having a low concentration or none of the cations operates at temperatures less than about 400° C.

A still further object of the invention is to provide a method and system of the type set forth, including the first and second storage means connected to the means for distilling the first and second electrolytes respectively storing the material having a high concentration of the cations in the first storage means and the material having a low concentration or none of the cations in the second storage means, means connected to the first storage means for transmitting material stored therein to the compartment having the first electrolyte and means connected to the second storage means for transmitting material stored therein to the compartment having the second electrolyte.

A final object of the invention is to provide a system comprising an electrochemical cell having the two compartments separated by an ion exchange member with a metallic electrode in each compartment, one compartment containing a first electrolyte of a non-aqueous solvent and a salt having cations of the metallic electrode and the other compartment containing a second electrolyte of the solvent and a salt with the first and second electrolytes having different concentrations of the cations, the non-aqueous ionic solvent being capable of forming a complex with the cations wherein the free energy of formation of the complex is not greater than about $-5$ Kcal/mole and wherein the melting point of any mixture of the solvent and the salt is not greater than about 300° C., the non-aqueous ionic solvent being selected from the group consisting of salts of alkali metals, indium, and ammonia, $POH_3$ wherein H is a halide, $SOH_2$ wherein H is a halide, R-pyridinium halide wherein R is an alkyl radical, $R_3$ amine wherein R is an alkyl radical, means connected to the cell receiving the first and second electrolytes and producing material having a high concentration of the cations and material having a low concentration or none of the cations, and means for recycling the material having the high concentration of the cations to the compartment having therein the first electrolyte and for recycling the material having the low concentration or none of the cations to the compartment having therein the second electrolyte, thereby regenerating the electrochemical cell.

These and other objects of the invention may more readily be understood when taken in conjunction with the following specification and drawings in which :

DESCRIPTION OF THE PREFERRED EMBODIMENT

Figure 1:
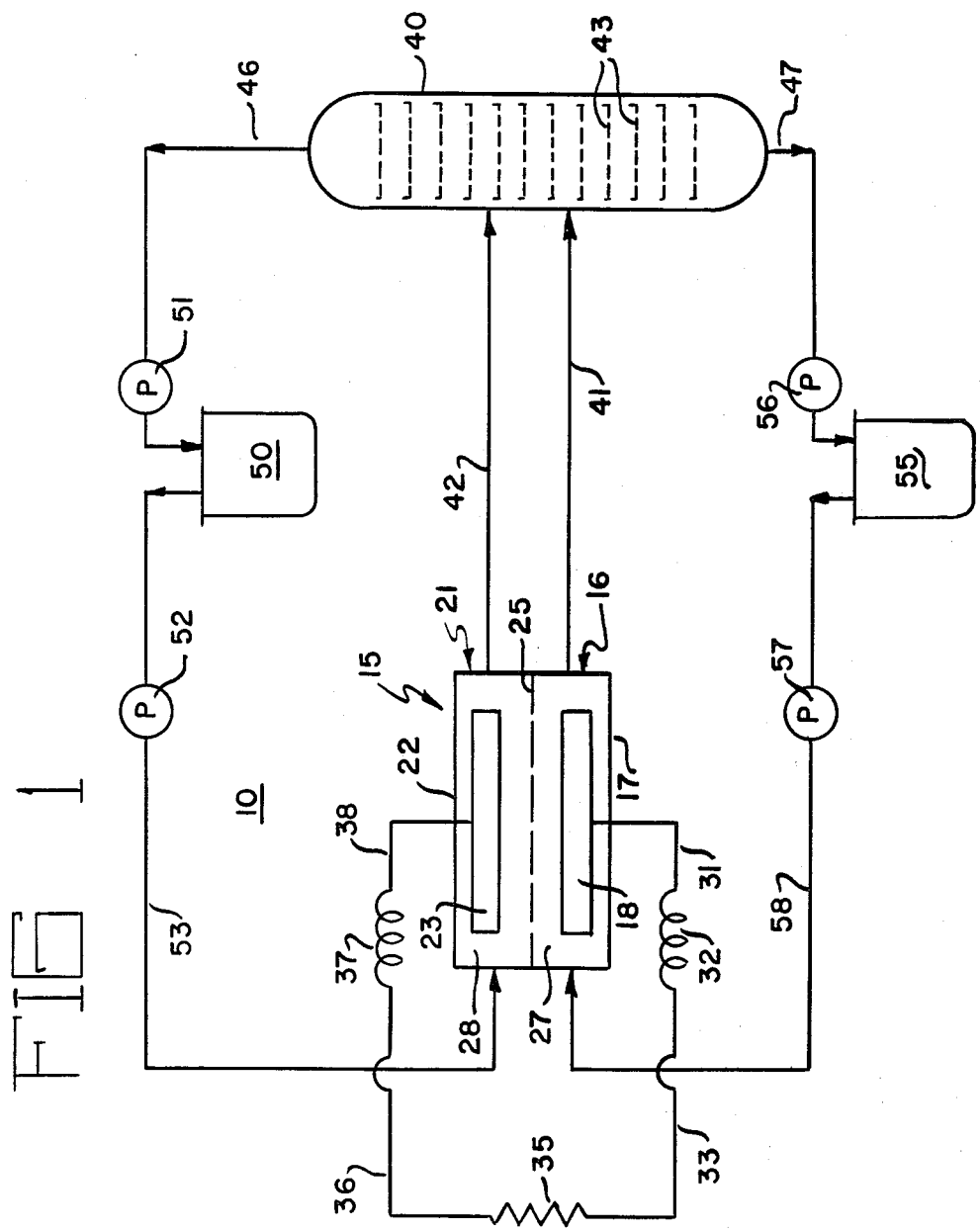
FIG. 1 is a schematic diagram of the present invention.

Referring to the drawings and particularly FIG. 1, there is disclosed a system 10 including an electrochemical cell 15 connected to a distillation column or still 40. The electrochemical cell 15 includes an anode 16 comprising a container 17 having a metallic electrode 18 disposed therein. The electrochemical cell 15 further includes a cathode 21 including a cathode container 22 and a metallic electrode 23 disposed therein. The anode 16 and the cathode 21 are separated by an ion exchange member 25 which segregates a first electrolyte 27 disposed in the anode container 17 in contact with the metallic anode 18 and a second electrolyte 28 disposed in the cathode container 22 in contact with the metallic cathode 23, while permitting ion transfer therebetween.

An electrical conductor 31 connects the anode electrode 18 to an inductor 32, and an electrical conductor 33 connects the inductor 32 with an electrical load 35. The electrical load 35 is connected by an electrical conductor 36 to an inductor 37 which in turn is connected by an electrical conductor 38 to the cathode electrode 23.

The distillation column or still 40 is connected by two conduits 41 and 42 respectively to the anode container 17 and the cathode container 22, thereby to provide transportation means for the first electrolyte 27 in the anode container 17 and the second electrolyte 28 in the cathode container 22 between the electrochemical cell 15 and the still 40. The still 40 includes a plurality of vertically spaced apart trays 43, as is well known, to provide separation of the lower boiling material which leaves the still 40 through a distillate outlet conduit 46 at the top of the still and the higher boiling point material which leaves the still through the bottoms outlet conduit 47. The lower boiling point material leaving the still 40 through the distillate outlet conduit 46 is pumped by means of a pump 51 to a distillate storage tank 50 and from there is pumped by a pump 52 through a conduit 53 to the cathode 21 of the electrochemical cell 15 and more particularly to the cathode container 22. The bottoms or higher boiling point material leaves the still 40 through the bottoms outlet conduit 47 and is pumped by a pump 56 to the bottoms storage tank 55 and from there is pumped by a pump 57 through a conduit 58 into the anode 16 of the electrochemical cell 15 and more particularly into the anode container 17 thereof. Thus, the system 10 provides a closed loop between the electrochemical cell 15 and the distilling means or still 40 which includes storage capacity means 50 and 55 for purposes hereinafter set forth.

The electrochemical cell 15 of the system 10 is based on the concentration cell principle wherein the electrolyte 27 in the anode 16 is chemically formulated from the same constituents as the electrolyte 28 in the cathode 21; however, the molar concentrations of the ionic solvent and the salt making up the electrolytes are different in the cathode and the anode. Additionally, the chemical constituents of the electrolytes 27 and 28 are so selected such that a chemical complex is formed which is thermally decomposed in the still 40 and thereafter formed in one of the anode 16 or cathode 21. The chemical constituents of the electrolytes 27, 28 are selected so that the still 40 is operated at a temperature not to exceed about 800° C. and preferably less than 400° C.

Accordingly, it is preferred that the electrolyte which is a complex of an ionic solvent and a salt have a melting point less than about 300° C. and that the boiling point of the pure compartments of the electrolyte 27, 28 be sufficiently low that the still 40 can be operated at a temperature of less than about 400° C.

In the preferred embodiment of the invention, the anode electrode 18 and the cathode electrode 23 are aluminum metal and the electrolyte 27, 28 is a complex of ethyl pyridinium chloride solvent and aluminum chloride. The sublimation temperature of aluminum chloride is 178° C. and the melting point of the ethyl pyridinium chloride is also low with the complex formed thereby being liquid at temperatures of about 60° C.

In order for the electrochemical cell 15 to operate efficiently and economically, it is necessary that the free energy of formation of the electrolyte complex be less than about −5 Kcal/mole as the more negative the free energy the greater the EMF of the electrochemical cell 15. Also, the electrolyte concentration gradient in combination with the salt-solvent complex in one electrolyte should be sufficient to provide a good driving force across the membrane 25, it being apparent that during operation of the electrochemical cell 15 the concentration gradient between the half cells diminishes.

As is known, the electrolyte 27 in the anode 16 begins with a lesser low concentration of aluminum ions and a higher concentration of the ionic solvent compared to the electrolyte in the cathode 21. It is necessary to establish complex formation in one of the electrodes which in addition to the concentration gradient provides a driving force across the ion exchange member or membrane 25. It may not be necessary that the anode electrolyte 27 have less than 50 mole percent salt, depending on the stoichiometry of the system but with the aluminum chloride system molar concentrations of the electrolytes should be on opposite sides of the 50% concentration level.

When an electrical load 35 is connected to establish a circuit as shown in FIG. 1, the aluminum electrode 18 dissolves in the electrolyte 27 thereby increasing the aluminum ion concentration. Simultaneously, aluminum ions in the cathode electrolyte 28 plate out on the electrode 23 decreasing the aluminum ion concentration in the cathode electrolyte 28, thereby causing electrolytes 27 and 28 to approach the same aluminum ion concentration.

At a predetermined value of aluminum ion concentration gradient across the anode electrolyte 27 and the cathode electrolyte 28, the electrolytes are transported through conduits 41 and 42 to a distillation column or still 40. By selectively choosing the ionic solvent and salt which are the constituents of the electrolyte 27, 28, the distillation process may be accomplished at a relatively low temperature such as in the range of less than about 400° C. In this manner, a solar collector (not shown) may be used as a heat source for the distillation process in the still 40. Also, low grade industrial waste heat may be used as a heat source, various off gases from combustion processes or waste steam being entirely satisfactory for this purpose.

Separation in the distillation column or still 40 takes place with the lower boiling point materials, in this case the aluminum chloride coming off as a distillate and leaving the still 40 through the distillate outlet conduit 46 and being pumped to the distillate storage tank 50. The higher boiling point material leaves the distillation column or still 40 through the bottoms outlet conduit 47 and is transmitted to a bottoms storage facility or tank 55. Subsequently, the distillate material containing a high concentration of aluminum chloride is transmitted through the conduit 53 to the cathode container 22 thereby re-establishing the aluminum ion concentration in the electrolyte 28 while the bottoms material containing a relatively low or no aluminum ion concentration is transmitted through the conduit 58 to the anode container 17 thereby re-establishing the aluminum ion concentration in the electrolyte 27. By this mechanism, the electrolytes 27 and 28 are replenished toward their original aluminum ion concentration through the use of low grade heat either from a solar collector or industrial waste.

Other electrode metals in addition to aluminum which may be useful in the invention are iron, antimony and silicon while alternatives for the electrolyte 27, 28 include as ionic solvents the salts of various alkali metals, indium and ammonium. Also, $POH_3$ and $SOH_3$, wherein H is a halide are suitable as ionic solvents as are in general R-Pyridinium halides wherein R is an alkyl radical and $R_3$ amine wherein R is a alkyl radical. Critical criteria are the free energy of formation of the complex between the salt of the metal electrode and the ionic solvent and the melting points of the ionic solvent, the salt of the metal electrode and the complex formed thereby. Since solutions of aluminum chloride and ethyl pyridinium chloride are liquid are 60° C., this is the preferred electrolyte 27, 28, but alternatives as suggested above are entirely within the scope of the invention.

Figure 2:
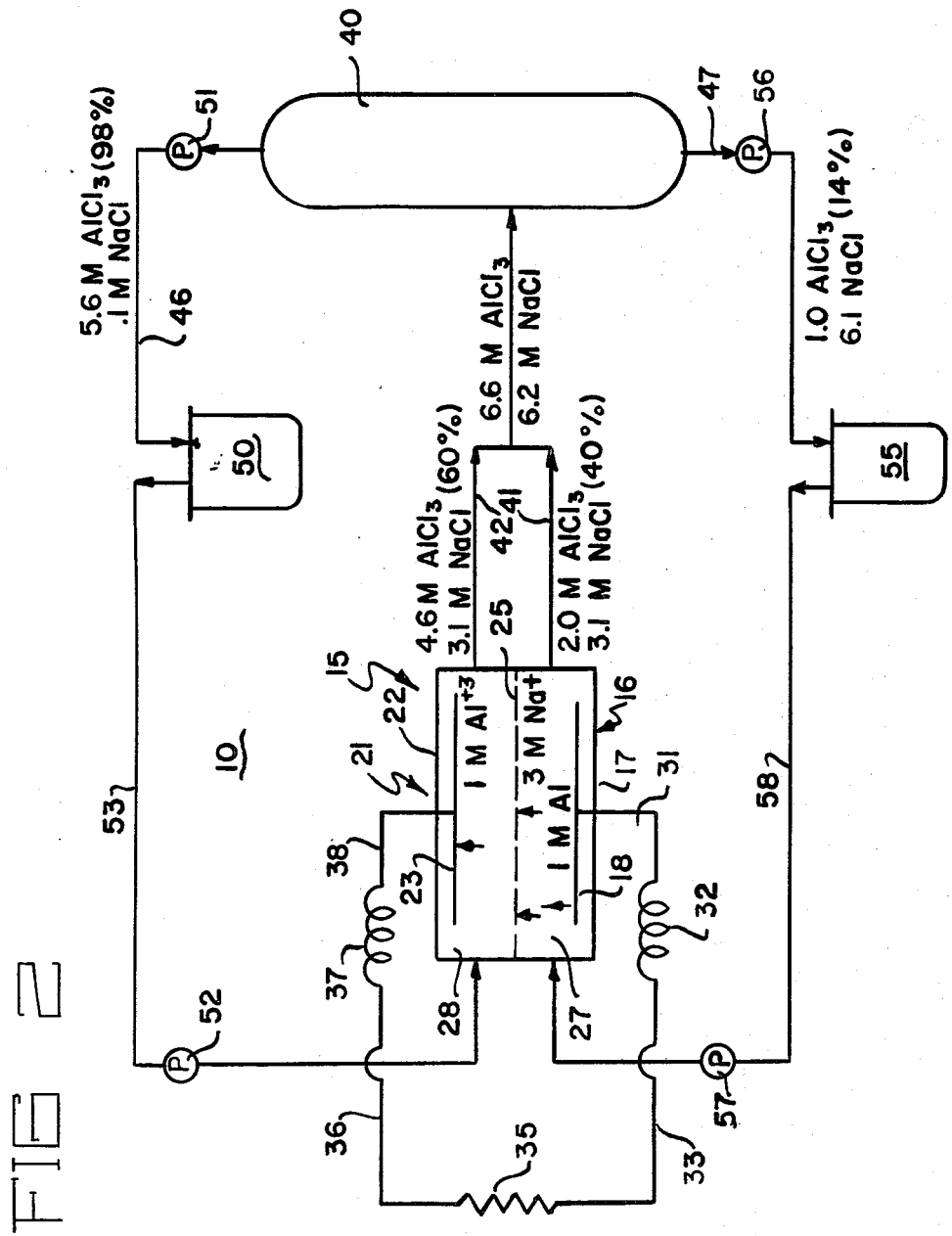
FIG. 2 is a schematic diagram of the invention showing mass transfer corresponding to three Faradays of electricity.

Efficiency of the system 10 is calculated as will be described for electrochemical cell 15 having aluminum electrodes and an electrolyte 27, 28 consisting of an ionic solvent of sodium chloride and aluminum chloride. The illustration is with sodium chloride a rather high melting point solvent, because of available phase diagrams and enthalpy data. It is assumed that the cell 15 operates at a steady state, see FIG. 2, with an anode electrolyte 27 having 2.0 moles aluminum chloride and 3.1 moles sodium chloride (40 mole percent aluminum chloride) and with the cathode electrolyte having 4.6 moles aluminum chloride and 3.1 moles sodium chloride (60 mole percent aluminum chloride). The material charged to the still 40 has 6.6 moles aluminum chloride and 6.2 moles sodium chloride. The distillate bottoms was designated 14 mole percent aluminum chloride and 86 mole percent sodium chloride due to the formation of the complex whereas the distillate was substantially 100% aluminum chloride. The number of moles of aluminum chloride and sodium chloride in each stream were calculated for the transfer 1 gram atom aluminum between the anode 18 and cathode 23, as were the efficiency estimates.

The energy generated in the concentration cell 15 is given by the number of Faradays multiplied by the cell potential which is 0.75 volts for the above-identified two half cells. Assuming that 3 Faradays pass through the cell 15, the calculated energy is $$e(cell) = 3 \times 96{,}500 \times 0.75 = 2.17 \times 10^5 \text{ joules per mole of Al.}$$

Because some energy is lost due to internal resistance of the cell, a 5% loss factor is assumed.

Figure 3:
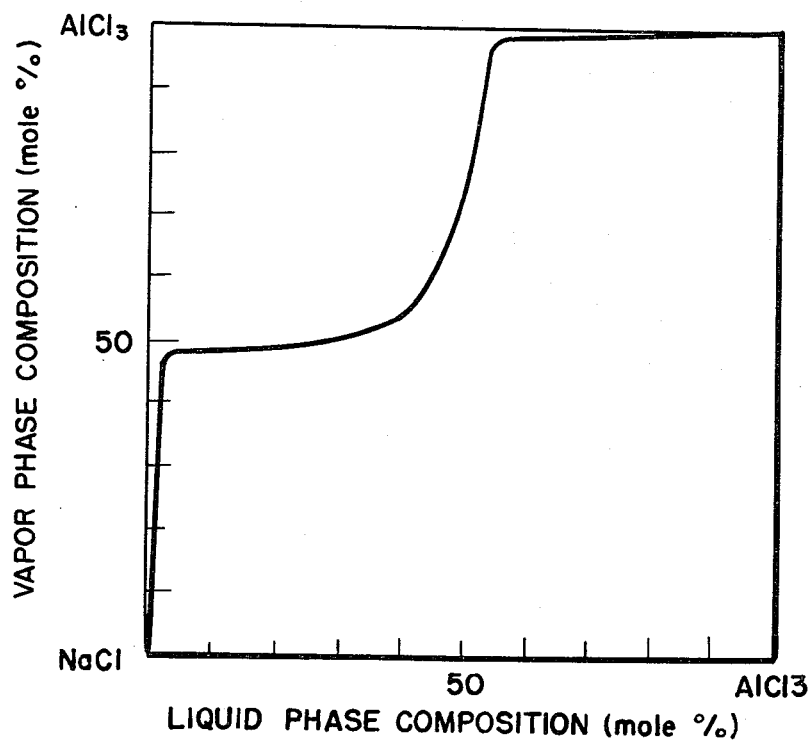
FIG. 3 is a graph illustrating the vapor-liquid equilibrium curve of the sodium chloride-aluminum chloride system.
Figure 4:
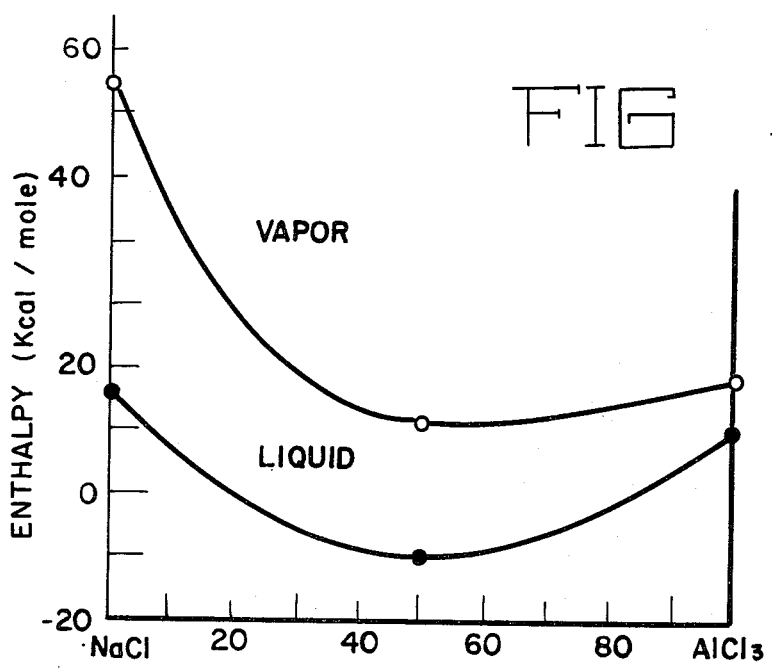
FIG. 4 is a graph illustrating enthalpies of sodium chloride and aluminum chloride liquids and vapors.

The energy required to separate the electrolyte 27, 28 into the aforesaid streams was estimated by graphical method, using vapor-liquid equilibrium curves (FIG. 3) and an enthalpy diagram of both the liquid and vapor phases (FIG. 4).

The vapor-liquid equilibrium curve (FIG. 3) for the sodium chloride-aluminum chloride system is concave at both ends and convex in the center, this being due to the formation of the sodium aluminum tetrachloride complex which is sufficiently stable that the vapor above melts containing up to 40 mole percent aluminum chloride is virtually pure complex. Above 45 mole percent aluminum chloride, the pressure of aluminum chloride exceeds that of the complex.

Enthalpy curves for the liquid and vapor phases (FIG. 4) were derived from enthalpies for pure sodium chloride and aluminum chloride and from enthalpies of reaction of the complex. The heat balance equation is:

$$h_\Delta = h_D - (Q/D)$$

where $h_\Delta$ is the heat flux per mole of distillate, $h_D$ is the enthalpy of the distillate (11.5 Kcal/mole), Q is the heat removed by the coolant, and D is the number of moles of distillate. For an arbitrarily chosen reflux ratio of 2, one mole of distillate requires 3 moles of aluminum chloride condensate, since:

$$V = D + L \text{ and } L/D = 2$$

For a condenser operating at the dew point, Q is the heat of condensation of 3 moles of aluminum chloride which is 9.5 Kcal/mole, whereby:

$$h_\Delta = 11.5 + 28.5 - 40 \text{ Kcal/mole}$$

The heat flux through the condenser is 40 Kcal/mole of distillate.

Using graphical means, the heat flux through the reboiler can now be determined assuming that the feed stream to the distillation column 40 contains 52 mole percent aluminum chloride at the bubble point temperature and assuming the bottoms contain 14 mole percent aluminum chloride, the reflux is calculated at 51 Kcal/mole. From available vapor-liquid equilibrium curves (FIG. 4) it can be graphically determined that eleven stages are necessary to separate a stream containing 52 mole percent aluminum chloride into streams containing 14 mole percent aluminum chloride and 98 mole percent aluminum chloride at an energy cost of 51 Kcal/mole of distillate of which 40 Kcal/mole are potentially recoverable and 11 Kcal/mole are converted into chemical energy.

For an electrochemical cell 15 operating at a temperature that is close to the bubble point of the electrolyte 27, 28, practically no heat would be needed to heat up the stream before entering the distillation column 40 and no heat is recovered from the condenser (not shown). The efficiency is then calculated by the electrical output of $2.17 \times 10^5$ joules multiplied by the resistance loss factor, assumed to be 95%, and divided by the distillation energy for 5.7 moles of distillate. This calculation results in a value of 0.17 or a 17% efficiency. If a system utilizes the reject heat from the condenser (not shown), the efficiency becomes 38% since 25.8 Kcal/mole of the 40 Kcal/mole flowing through the condenser are due to aluminum chloride condensation which is high quality heat recoverable for space heating or other applications.

These calculations are based on the aluminum chloride-sodium chloride system because of the available data such as the vapor-liquid equilibrium curve (FIG. 3) and the enthalphy curves (FIG. 4). Like calculations for a preferred system of ethyl pyridinium chloride and aluminum chloride can be made. As before stated, the critical characteristics of this method and system are the low melting points of the ionic solvent and salt which make up the electrolyte as well as the complex formed thereby in order to enable a solar collector or other low grade heat source to be used in the distillation column 40. The provision of distillate and bottoms storage 50, 55 enable the system 10 of this invention to be used semi-continuously or in batch and certainly for periods when the heat source is unavailable. By discharging electrolyte 27, 28 in batch quantities, the stored material in the distillate storage 50 and bottom storage 55 can be used to provide a fresh charge to the electrochemical cell 15 if the available heat source is intermittent such as with a solar collector wherein the sun in unavailable due to day night cycle and to overcast periods.

The invention described is a method and system for thermally regenerating an electrochemical cell of the concentration type. The electrodes disclosed are aluminum metal, but as stated, other metals, the salts of which form stable, low melting point complexes, are acceptable, such as iron, antimony and silicon. Various ionic solvents, most likely non-aqueous, such as alkali metal salts, particularly the halides, indium salts, particularly halides, and salts of ammonia, particularly halides, are acceptable. So also are halides of $PO^{+3}$ and $SO^{+2}$. Organic solvents such as R-pyridinium halide where R is an alkyl radical, particularly ethyl, and $R_3$ amine where R is an alkyl radical, particularly trimethyl are available, with ethyl pyridinium chloride being preferred.

Where the half cells are based on the aluminum chloride system, the half cell containing the complex will be the cathode since the aluminum tetrachloride complex is only formed when aluminum chloride is present in excess of fifty mole percent. Where other metal electrodes are employed the stoichiometry will dictate the available electrolyte concentrations.

While there has been described what at present is considered to be the preferred embodiment of the present invention, it will be understood that various modifications and alternatives may be made therein without departing from the scope of the invention and it is intended to cover in the claims appended hereto all such modifications and alteration.

The embodiment of the invention in which an exclusive property or privilege is claimed are defined as follows:

1. A system comprising an electrochemical cell having first and second metallic electrodes respectively positioned in contact with first and second electrolytes separated by an ion exchange member, said first and second electrolytes being composed of different concentrations of an ionic solvent and a salt having cations of the metallic electrodes, said ionic solvent and said salt in the concentrations of one or said first and second electrolytes forming a complex wherein the free energy of formation of said complex is less than about $-5$ Kcal/mole, thermal decomposing means for receiving said first and second electrolytes and thermally decomposing the complex whereby producing a first feed material for said first electrolyte having a high concentration of said cations and second feed material for said second electrolyte having a low concentration or none of said cations, and means for recycling the first feed material to said first electrolyte and the second feed material to said second electrolyte, thereby regenerating said electrochemical cell.

2. The system of claim 1, wherein said electrodes are metal selected from the group consisting of aluminum, iron, antimony and silicon.

3. The system of claim 1, wherein the anions of said salt and said ionic solvents are halides.

4. The system of claim 3, wherein said electrodes are aluminum and said anions are chloride and bromide.

5. The system of claim 1, wherein said thermal decomposing means operates at temperatures less than about 400° C.

6. A system comprising an electrochemical cell having two compartments separated by an ion exchange member with a metallic electrode in each compartment, one compartment having therein a first electrolyte of an ionic solvent and a salt having cations of the metallic electrode and the other compartment having therein a second electrolyte of said ionic solvent and said salt with said first and second electrolytes having different concentrations of said cation, said ionic solvent forming a complex with said salt wherein the free energy of formation of said complex is less than about $-5$ Kcal/mole, means connected to said cell receiving said first and second electrolytes and producing a material having a high concentration of said cations and a material having a low concentration or none of said cations, and means for recycling the material having the high concentration of said cations to the compartment having therein said first electrolyte and for recycling the material having a low concentration or none of said cations to the compartment having therein said second electrolyte, thereby regenerating said electrochemical cell.

7. The system of claim 6, wherein said electrodes are aluminum.

8. The system of claim 7, wherein the anion of said salt and the anion of said solvent are the same and are chloride or bromide.

9. The system of claim 7, wherein said first electrolyte has an aluminum ion concentration not less than about 50 mole percent.

10. The system of claim 7, wherein the material having a high concentration of said cations is close to 100% aluminum chloride.

11. A system comprising an electrochemical cell having two compartments separated by an ion exchange member with a metallic electrode in each compartment, one compartment having therein a first electrolyte of an ionic solvent and a salt having cations of the metallic electrode and the other compartment having therein a second electrolyte of said ionic solvent and said salt with said first and second electrolytes having different concentrations of said cation, said ionic solvent being capable of forming a complex with said salt wherein the free energy of formation of said complex is less than about $-5$ Kcal/mole, said ionic solvent and said salt having melting points not greater than about 300° C., means operating at temperatures not greater than about 400° C. connected to said cell receiving said first and second electrolytes and producing material having a high concentration of said cations and a material having a low concentration or none of said cations, and means for recycling the material having the high concentration of said cations to the compartment having therein said first electrolyte and for recycling the material having the low concentration or none of said cations to the compartment having therein said second electrolyte, thereby regenerating said electrochemical cell.

12. The system of claim 11, wherein the metallic electrodes are aluminum, the salt is aluminum chloride and the ionic solvent is ethyl pyridinium chloride.

13. The system of claim 12, wherein said means producing materials having high and low concentrations of said cations operates at temperatures less than about 400° C.

14. The system of claim 11, wherein said means producing materials having high and low concentrations of said cations is a solar heated distillation column.

15. A system comprising an electrochemical cell having two compartments separated by an ion exchange member with a metallic electrode in each compartment, one compartment having therein a first electrolyte of an ionic solvent and a salt having cations of the metallic electrode and the other compartment having therein a second electrolyte of said ionic solvent and said salt with said first and second electrolytes having different concentrations of said cation, said ionic solvent forming a complex with said salt wherein the free energy of formation of said complex is less than about $-5$ Kcal/mole, said ionic solvent and said salt and said complex having melting points less than about 300° C., distillation means operating at temperatures less than about 400° C. connected to said cell receiving said first and second electrolytes and producing material having a high concentration of said cations and a material having a low concentration or none of said cations, first and second storage means connected to said distillation means respectively storing the material having a high concentration of said cations and the material having a low concentration or none of said cations, means connected to said first storage means for transmitting material stored therein to the compartment having said first electrolyte, and means connected to said second storage means for transmitting material stored therein to the compartment having said second electrolyte, thereby regenerating said electrochemical cell during periods when said distillation means is in operation and during periods when said distillation means is inoperative and said storage means have a supply of material therein.

16. The system of claim 15, and further comprising pump means connected to said distillation means for pumping the products of said distillation means to said first and second storage means and pump means connected to said first storage means for pumping the materials stored therein to the said compartment having said first electrolyte therein and pump means connected to said second storage means for pumping material stored therein to said compartment having said second electrolyte therein, said pump means facilitating operation of said system in continuous or batch fashion.

17. A system comprising an electrochemical cell having two compartments separated by an ion exchange member with a metallic electrode in each compartment, one compartment containing a first electrolyte of a non-aqueous solvent and a salt having cations of the metallic electrode and the other compartment containing a second electrolyte of said solvent and said salt with said first and second electrolytes having different concentration of said cations, said non-aqueous ionic solvent forming a complex with said salt wherein the free energy of formation of said complex is less than about $-5$ Kcal/mole and wherein the melting point of any mixture of said solvent and said salt is less than about 300° C., said non-aqueous ionic solvent being selected from the group consisting of salts of alkali metals, indium and ammonia, $POH_3$ wherein H is a halide, $SOH_2$ wherein H is a halide, R-pyridinium halide wherein R is an alkyl radical, $R_3$ amine wherein R is an alkyl radical, means connected to said cell receiving said first and second electrolytes and thermally distilling a first material having a high concentration of said cations and a second material having a low concentration or none of said cations, and means for recycling the first material to the compartment having therein said first electrolyte and for recycling the second material to the compartment having therein said second electrolyte, thereby regenerating said electrochemical cell.

18. The system of claim 17, wherein said non-aqueous ionic solvent is ethyl pyridinium chloride.

19. The system of claim 18, wherein said electrodes are aluminum, said salt is aluminum chloride, and said means thermally distilling said first and second materials operates at a temperature of less than about 400° C.

20. A method of regenerating an electrochemical cell comprising providing first and second metallic electrodes respectively positioned in contact with first and second electrolytes separated by an ion exchange member, said first and second electrolytes being composed of different concentrations of an ionic solvent and a salt having cations of the metallic electrodes, said ionic solvent and said salt in the concentrations of one of said first and second electrolytes forming a complex wherein the free energy of formation of said complex is less than about −5 Kcal/mole, providing thermal decomposing means for receiving said first and second electrolytes and thermally decomposing the complex thereby producing a first feed material for said first electrolyte having a high concentration of said cations and a second feed material for said second electrolyte having a low concentration or none of said cations, and recycling the first feed material to said first electrolyte and the second feed material to said second electrolyte, thereby regenerating said electrochemical cell.

21. The method of claim 20, wherein the electrodes are metal selected from the group consisting of aluminum, iron, antimony and silicon.

22. The method of claim 20, wherein both electrodes are aluminum.

23. The method of claim 20, wherein the ionic solvent and salt and complex formed thereby have melting points less than about 300° C. and the thermal decomposing means operates at temperatures of less than about 400° C.

24. The method of claim 20, and further comprising accumulating and storing the first and second feed material during operation of said electrochemical cell.

25. The method of claim 20, wherein the ionic solvent is selected from the group consisting of salts of alkali metals, indium and ammonia, $POH_3$ wherein H is a halide, $SOH_2$ wherein H is a halide, R-pyridinium halide wherein R is an alkyl radical, $R_3$ amine wherein R is an alkyl radical.

26. The method of claim 20, wherein the electrodes are aluminum and the ionic solvent is ethyl pyridinium chloride.

* * * * *